(12) United States Patent
Wu

(10) Patent No.: US 7,668,043 B2
(45) Date of Patent: Feb. 23, 2010

(54) METHODS AND SYSTEMS FOR SONIC LOG PROCESSING

(75) Inventor: Peter T. Wu, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 10/904,035

(22) Filed: Oct. 20, 2004

(65) Prior Publication Data
US 2006/0083108 A1 Apr. 20, 2006

(51) Int. Cl.
G01V 1/40 (2006.01)
(52) U.S. Cl. .......................... 367/31; 367/35
(58) Field of Classification Search .......... 367/25, 367/27, 29, 31, 32, 33, 35; 702/6
See application file for complete search history.

(56) References Cited

U.S. PATENT DOCUMENTS

| 4,594,691 | A | 6/1986 | Kimball et al. |
| 4,698,792 | A | 10/1987 | Kurkjian et al. |
| 4,698,793 | A | 10/1987 | Wu |
| 4,932,003 | A | 6/1990 | Winbow et al. |
| 5,229,939 | A | 7/1993 | Scheibner et al. |
| 5,278,805 | A | 1/1994 | Kimball |
| 5,381,092 | A | 1/1995 | Freedman |
| 5,594,706 | A | 1/1997 | Shenoy et al. |
| 5,740,124 | A | 4/1998 | Chunduru et al. |
| 6,084,826 | A | 7/2000 | Leggett, III |
| 6,427,124 | B1 | 7/2002 | Dubinsky et al. |
| 6,449,560 | B1* | 9/2002 | Kimball .......................... 702/6 |
| 6,581,010 | B2 | 6/2003 | Dubinsky et al. |
| 6,625,541 | B1* | 9/2003 | Shenoy et al. .................. 702/6 |
| 6,631,327 | B2 | 10/2003 | Hsu et al. |
| 6,654,688 | B1* | 11/2003 | Brie et al. ....................... 702/2 |
| 6,691,036 | B2 | 2/2004 | Blanch et al. |
| 6,850,168 | B2 | 2/2005 | Tong et al. |
| 6,868,341 | B2* | 3/2005 | Valero .......................... 702/11 |
| 6,907,349 | B2* | 6/2005 | Mandal ....................... 367/49 |
| 6,930,616 | B2 | 8/2005 | Tong et al. |
| 2004/0001389 | A1 | 1/2004 | Tang |
| 2004/0122595 | A1 | 6/2004 | Valero |
| 2004/0145503 | A1 | 7/2004 | Blanch et al. |
| 2004/0158404 | A1 | 8/2004 | Gaston et al. |
| 2004/0199331 | A1 | 10/2004 | Mandal |
| 2005/0251342 | A1* | 11/2005 | Market et al. .................. 702/6 |
| 2005/0254343 | A1* | 11/2005 | Saiki et al. .................... 367/31 |

OTHER PUBLICATIONS

Kimball, Christopher V. "Shear slowness measurement by dispersive processing of the borehole flexural mode." Geophysics, Mar.-Apr. 1998.*

(Continued)

Primary Examiner—Scott A Hughes
(74) Attorney, Agent, or Firm—Matthias Abrell; Jaime Castano; Dale Gaudier

(57) ABSTRACT

Techniques for processing sonic waveform data include processing the data based on an initial set of formation-borehole parameters, to produce initial coherence peak attributes, wherein the processing is performed in a borehole; sending the initial coherence peak attributes uphole via telemetry; and correcting the initial coherence peak attributes, based on a second set of formation-borehole parameters, to produce corrected coherence peak attributes.

20 Claims, 6 Drawing Sheets

OTHER PUBLICATIONS

Kimball and Scheibner. "Error bars for sonic slowness measurements." Geophysics, Mar.-Apr. 1998.*

Borre et al., "Fluid Substitution in Horizontal Chalk Wells and its Effect on Acoustic Rock Properties—A Case study comparing Logging while Drilling and Wireline Acoustic Data," *SPWLA 45th Annual Logging Symposium* (Jun. 6-9, 2004).

* cited by examiner

METHODS AND SYSTEMS FOR SONIC LOG PROCESSING

BACKGROUND OF INVENTION

1. Field of the Invention

The invention relates generally to sonic well logging. More particularly, the invention relates to methods and systems for sonic log data processing.

2. Background Art

The oil and gas industry uses various tools to probe formations penetrated by a borehole in order to locate hydrocarbon reservoirs and to determine the types and quantities of the hydrocarbons. Among these tools, sonic tools have been found to provide valuable information regarding formation properties. In sonic logging, a tool is typically lowered into a borehole, either after the well is drilled or while the well is being drilled (LWD/MWD), and sonic energy is transmitted from a source into the borehole and the formation. The sonic waves that travel in the formation are then detected with an array of receivers. A typical sonic log can be recorded on a linear scale of slowness versus depth in the borehole, and is typically accompanied by an integrated-travel-time log in which each division indicates an increase of one microsecond of the total travel time period. Sonic logs are typically used as direct indications of subsurface properties or—in combination with other logs or other knowledge of the subsurface properties—to find subsurface porosity and other parameters which cannot be measured directly.

Various analysis methods are available for deriving formation properties from the sonic log data. Among these, the slowness-time-coherence (STC) method is commonly used to process the monopole sonic signals for coherent arrivals, including the formation compressional, shear, and borehole Stoneley waves. See U.S. Pat. No. 4,594,691 issued to Kimball et al. and Kimball et al., Geophysics, Vol. 49 (1984), pp. 264-28. This method systematically computes the coherence (C) of the signals in time windows which start at a given time (T) and have a given window moveout slowness (S) across the array. The 2D plane C(S,T) is called slowness-time plane (STP). All the coherent arrivals in the waveform will show up in the STP as prominent coherent peaks. The three attributes of the coherent peak are the peak coherent value (COPK) and the peak location in the slowness-time plane (DTPK and TTPK). The attributes of these prominent coherent peaks are the condensed information extracted from the recorded waveforms. The attributes show the coherence, arrival time, and propagation slowness of all prominent wave components detected from the waveforms.

While the STC method has been very useful in deriving formation properties from sonic data, this method is most useful with non-dispersive waveforms (e.g., compressional and shear waves). This method is not optimal for dispersive waveforms (e.g., Stoneley waves and flexural waves). For processing the dispersive waveforms, the dispersive slowness-time-coherence (DSTC) method disclosed in U.S. Pat. No. 5,278,805 (assigned to the present assignee and incorporated by reference in its entirety) is preferred.

The DSTC method can process the quadrupole signals for formation shear slowness from LWD sonic tools. This is a model-based method in which a set of model dispersion curves are used in the processing to determine which model dispersion curve maximizes the semblance of the back-propagated signals. The formation shear slowness is one of the model parameters that are used to generate the set of dispersion curves. The formation shear slowness parameter value corresponding to the highest coherence peak from the best match dispersion curve would be output by DSTC as the shear slowness.

The DSTC method may use a concentric cylindrical layer model to represent an LWD sonic tool centered in a fluid filled borehole within a uniform formation. The use of a simple concentric cylindrical layer model is for convenience, but it is not essential. If necessary, a more complex model may also be used. The model dispersion curves used in the DSTC method depend not only on formation shear slowness (DTs), but also on other model parameters: formation compressional slowness (DTc), formation density ($\rho b$), mud slowness (DTm), mud density ($\rho m$), hole diameter (HD), the equivalent outer diameter of the tool (OD)—assuming the tool ID is fixed, collar density ($\rho st$), collar compressional slowness (DTc_st), and collar shear slowness (DTs_st). The current DSTC method assumes all these parameters are known and uses them to generate a set of dispersion curves as function of DTs. The first few parameters are related to formation and borehole properties (i.e., formation-borehole parameters) and the last few parameters are related to the collar (collar parameters). For a given size collar, the collar parameters are constants, which can be measured or pre-calibrated. On the other hand, the formation-borehole parameters are variables, changing from depth to depth and from well to well. Therefore, the formation-borehole parameters often need to be determined in order to have an accurate model for the DSTC method.

The formation-borehole parameters can be determined (estimated) from other LWD or offset well wireline measurements. Therefore, these parameters are often available at the surface (uphole). However, not all the formation-borehole parameters are available at all times. The LWD or offset well measurements may be performed after the sonic waveforms are acquired. In this case, the formation-borehole parameters will not be available for real-time processing of the sonic waveform. Even when the LWD data is measured at the same time as the sonic waveform measurements, there may be a delay before the LWD real-time data are available, especially if these other LWD tools are disposed above the sonic tool in the bottom hole assembly (BHA). The unavailability of the formation-borehole parameters downhole would prevent real-time DSTC processing of the sonic waveform data because it is impractical to send sonic waveforms through telemetry uphole during LWD time.

The DSTC method relies on the dispersion curves that correspond to the formation-borehole parameters. The dispersion curves needed for DSTC processing are usually obtained via interpolation from a large database of pre-computed dispersion curves. In the downhole environment, limitations on the downhole processor typically preclude the storage of large databases and any substantial computational load. This makes it difficult to perform real-time DSTC processing of the sonic waveform data in the downhole environments.

Real-time delivery of the shear slowness has many applications, such as pore pressure and wellbore stability predictions. The information related to pore pressure and wellbore stability is very important for the driller to safely drill the well. One approach to accomplishing real-time sonic data processing is to compress the sonic waveform data so that they can be transmitted via telemetry. The compressed data are then used at the surface to reconstruct the sonic waveform data (decompression) for processing (e.g., STC processing). One example of such an approach is disclosed in U.S. Pat. No. 5,594,706 issued to Shenoy et al. Another example is found in a co-pending U.S. patent application Ser. No. 10/711,524 by Wu et al., filed on Sep. 23, 2004.

While these data compression methods may allow real-time processing of sonic waveform data, data compression has limitations. For example, some loss of information may not be avoidable if the data are highly compressed. Therefore, there is still a need for alternative methods that permit real-time processing of sonic waveform data.

SUMMARY OF INVENTION

One aspect of the invention relates to methods for processing sonic waveform data. A method in accordance with one embodiment of the invention includes processing the sonic waveform data, based on an initial set of formation-borehole parameters, to produce initial coherence peak attributes, wherein the processing is performed in a borehole; sending the initial coherence peak attributes uphole via telemetry; and correcting the initial coherence peak attributes, based on a second set of formation-borehole parameters, to produce corrected coherence peak attributes.

One aspect of the invention relates to methods for processing original coherence peak attributes based on a new set of formation-borehole parameters. A method in accordance with one embodiment of the invention includes obtaining a correction factor, wherein the correction factor is obtained by a comparison between a set of dispersion curves used to compute the original coherence peak attributes and a second set of dispersion curves corresponding to the new set of formation-borehole parameters; and applying the correction factor to the original coherence peak attributes.

One aspect of the invention relates to methods for processing formation log data. A method in accordance with one embodiment of the invention includes processing the formation log data, based on a forward model having an initial set of formation-borehole parameters, to produce an initial value of a desired parameter, wherein the processing is performed in a borehole; sending the initial value of the desired parameter uphole via telemetry; and correcting the initial value of the desired parameter, based on a second set of formation-borehole parameters, to produce a corrected value of the desired parameter.

One aspect of the invention relates to systems for processing sonic waveform data. A system in accordance with one embodiment of the invention includes at least one processor and at least one memory, wherein the at least one memory stores at least one program having instructions for: processing the sonic waveform data, based on initial formation-borehole parameters, to produce initial coherence peak attributes, wherein the processing is performed in a borehole; sending the initial coherence peak attributes uphole via telemetry; and correcting the initial coherence peak attributes, based on a second set of formation-borehole parameters, to produce corrected coherence peak attributes.

One aspect of the invention relates to systems for processing formation log data. A system in accordance with one embodiment of the invention includes at least one processor and at least one memory, wherein the at least one memory stores at least one program having instructions for: processing the formation log data, based on a forward model having an initial set of formation-borehole parameters, to produce an initial value of a desired parameter, wherein the processing is performed in a borehole; sending the initial value of the desired parameter uphole via telemetry; and correcting the initial value of the desired parameter, based on a second set of formation-borehole parameters, to produce a corrected value of the desired parameter.

Other aspects and advantages of the invention will be apparent from the following description and the appended claims.

DETAILED DESCRIPTION

Embodiments of the invention relate to methods for processing downhole data (e.g., DSTC processing) to reduce telemetry bandwidth requirements for sending data uphole (e.g., in LWD operations) or to reduce the memory required for storing data for later retrieval (e.g., in wireline and logging-while-tripping (LWT) operations). In addition, embodiments of the invention also provide methods for deriving accurate formation parameters from the simplified data; these methods are typically performed at the surface after the simplified data have been transmitted (or brought up) to the surface. Embodiments of the invention are applicable to various types of downhole data. For clarity, the following description will use sonic tools and sonic data to illustrate embodiments of the invention. However, one of ordinary skill in the art would appreciate that embodiments of the invention are not so limited. Furthermore, while embodiments of the invention would be most beneficial for LWD or MWD operations, they can also be used in other oilfield operations (e.g., wireline operations).

Figure 1:
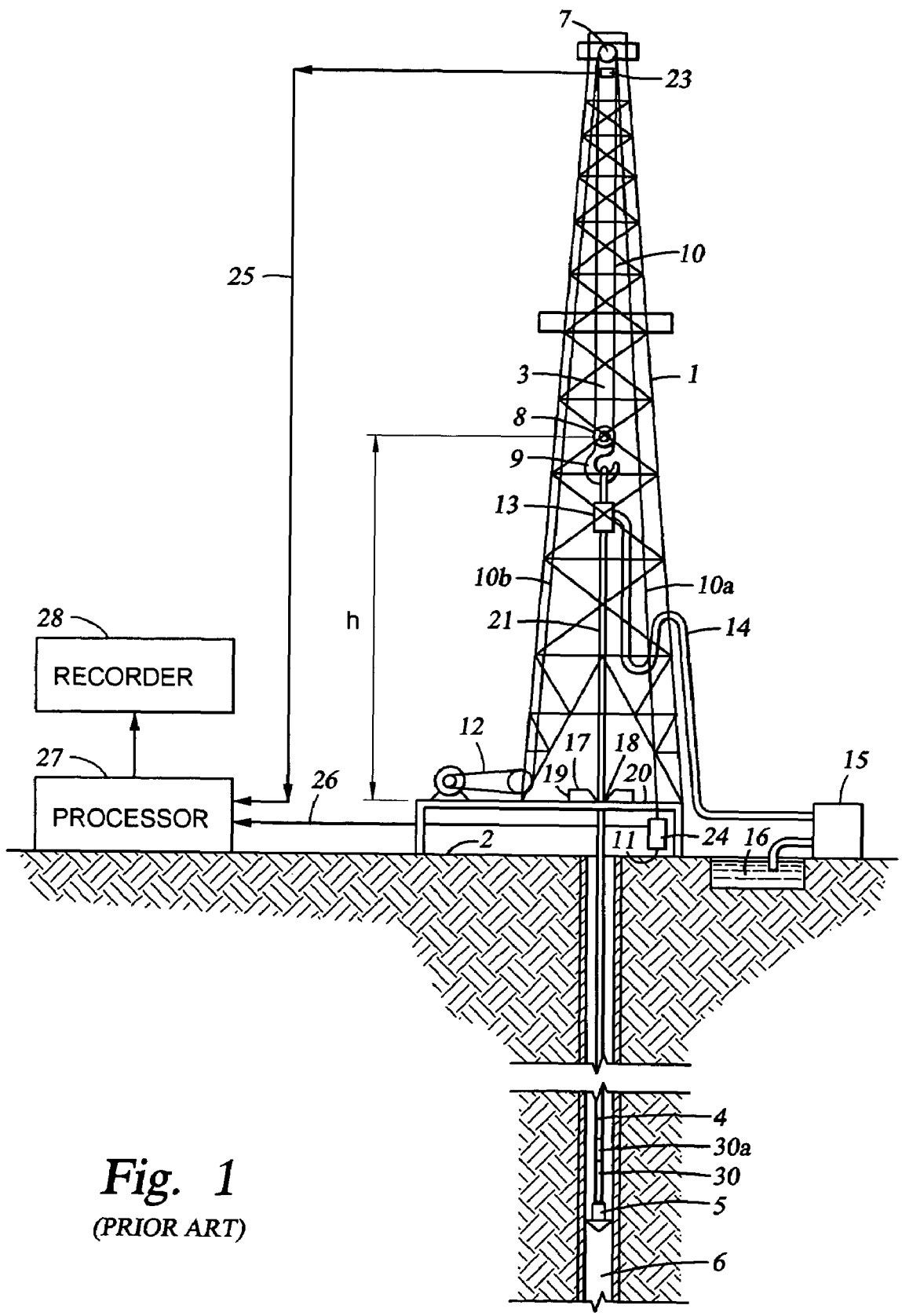
FIG. 1 shows a prior art logging-while-drilling system having a tool disposed in a borehole.

FIG. 1 shows a general illustration of a drilling rig and a drill string with a downhole logging tool in a borehole. The rotary drilling rig shown comprises a mast 1 rising above ground 2 and is fitted with a lifting gear 3. A drill string 4, formed of drill pipes screwed one to another, is suspended from the lifting gear 3. The drill string 4 has at its lower end a drill bit 5 for drilling the well 6. Lifting gear 3 consists of crown block 7, the axis of which is fixed to the top of mast 1, vertically traveling block 8, to which is attached hook 9, cable 10 passing round blocks 7 and 8 and forming, from crown block 7, on one hand dead line 10a anchored to fixed point 11 and on the other active line 10b which winds round the drum of winch 12.

Drill string 4 is suspended from hook 9 by means of swivel 13, which is linked by hose 14 to mud pump 15. Pump 15 permits the injection of drilling mud into well 6, via the hollow pipes of drill string 4. The drilling mud may be drawn from mud pit 16, which may be fed with surplus mud from well 6. The drill string 4 may be elevated by turning lifting gear 3 with winch 12. Drill pipe raising and lowering operations require drill string 4 to be temporarily unhooked from lifting gear 3; the former is then supported by blocking it with wedges 17 in conical recess 18 in rotating table 19 that is mounted on platform 20, through which the drill string passes. The lower portion of the drill string 4 may include one or more tools or instruments as shown at 30, for investigating downhole drilling conditions or for investigating the properties of the geological formations. Tool 30 shown is an acoustic logging tool having at least one transmitter and a plurality of receivers spaced therefrom.

Variations in height h of traveling block 8 during drill string raising operations are measured by means of sensor 23 which may be an angle of rotation sensor coupled to the faster pulley of crown block 7. Weight applied to hook 9 of traveling block 8 may also be measured by means of strain gauge 24 inserted into dead line 10a of cable 10 to measure its tension. Sensors 23 and 24 are connected by lines 25 and 26 to processing unit 27 which processes the measurement signals and which incorporates a clock. Recorder 28 is connected to processing unit 27, which is preferably a computer. In addition, the downhole sonic tool 30 may include a processing unit 30a. The downhole processing unit 30a and/or the surface processing unit 27 may be used to perform the data analysis and determination of formation properties in accordance with embodiments of the invention.

Sonic data acquired with a logging tool are waveforms received by the receivers. These waveforms may be displayed on a chart, or log, of waveform amplitude over time versus depth. Sonic waveforms include a large amount of data, which would be impracticable to send via telemetry in an LWD operation. However, most of the raw data do not contain critical information and can be removed without losing much of the information content. Therefore, preprocessing (simplification) of sonic data may be performed before final analysis to determine formation properties from the data.

The slowness-time-coherence (STC) method is among the most commonly used methods in sonic data processing. See U.S. Pat. No. 4,594,691 issued to Kimball et al. and Kimball et al., Geophysics, Vol. 49 (1984), pp. 264-28. The STC method processes the monopole sonic signals for coherent arrivals, including the formation compressional, shear, and borehole Stoneley waves. This method systematically computes the coherence (C) of the signals in time windows, which start at a given time (T) and have a given window moveout slowness (S) across the array. The time windows, which are determined by the start time (T) and the window moveout slowness (S), used in an STC process are based on the particular tool configuration and formation-borehole properties (e.g., borehole dimensions, mud types, and formation properties). Some of the parameters needed for the STC processing may not be optimum while logging the sonic data. Therefore, as a quality control measure, the STC processing is sometimes performed in a so-called recorded mode processing after the waveform data have been retrieved from the tool after the logging operation is completed. The STC processing produces a 2D plane C(S,T), called slowness-time plane (STP). All coherent arrivals in the waveform will show up in the STP as prominent coherent peaks. Each coherent peak has three attributes, the peak coherent value (COPK) and the peak location in the slowness-time plane (DTPK and TTPK), that can be used to determine formation properties. These attributes of the coherent peaks represent the condensed information extracted from the recorded waveforms.

As noted above, the STC method is most useful with non-dispersive waveforms (e.g., compressional and shear waves). For processing the dispersive waveforms, the dispersive slowness-time-coherence (DSTC) method is preferred. The DSTC method can process the quadrupole signals for formation shear slowness from LWD sonic tools. This is a model based method in which a set of model dispersion curves are used in the processing to determine which model dispersion curve maximizes the semblance of the back-propagated signals.

Figure 2:
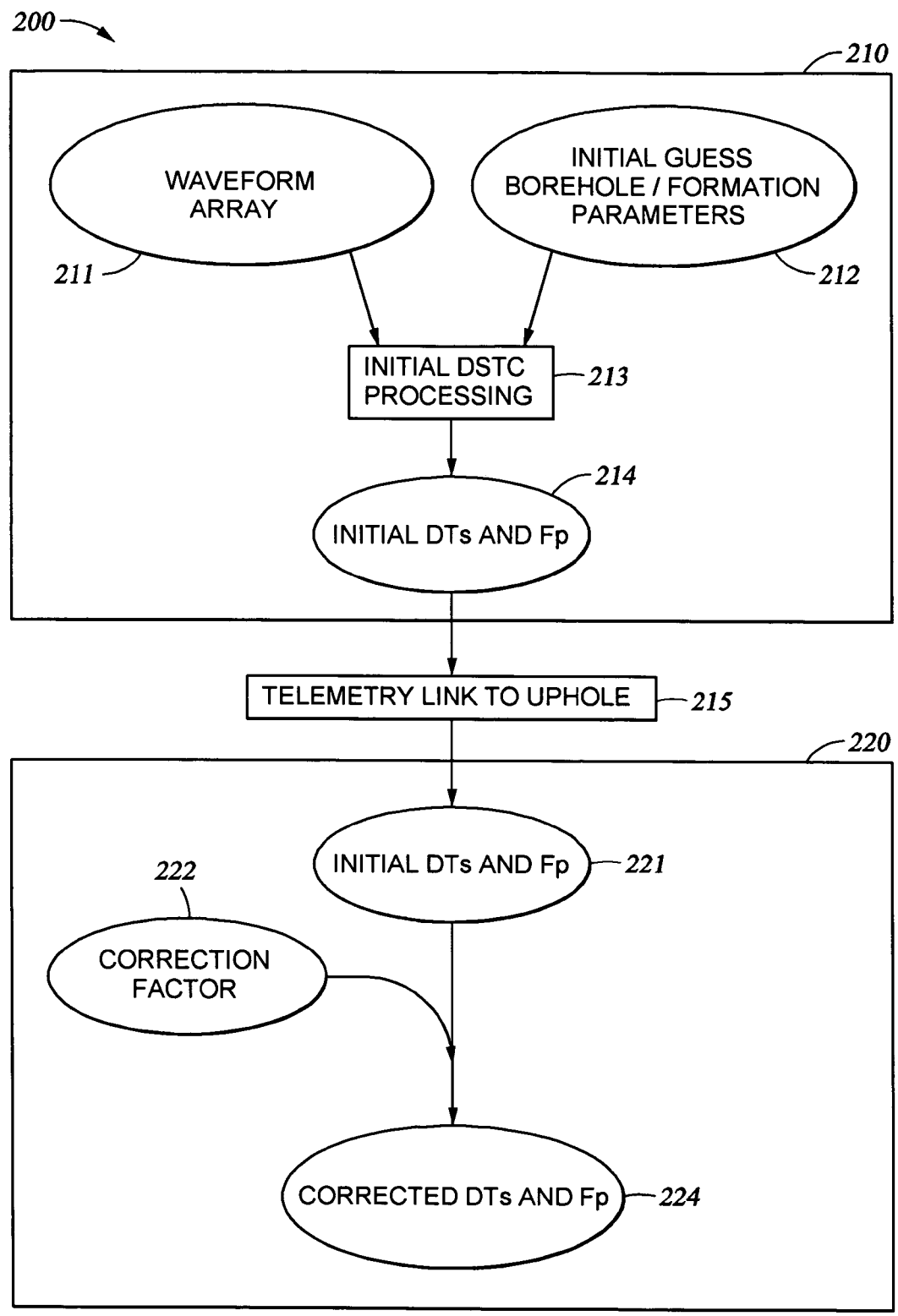
FIG. 2 shows a schematic of a method in accordance with one embodiment of the invention.

Embodiments of the invention make use of an improved strategy, using STC or DSTC, to condense the sonic data to facilitate telemetry transmission or to reduce the memory requirement for storage. For clarity, the following description uses DSTC processing of quadrupole signals to illustrate embodiments of the invention. However, one of ordinary skill in the art would appreciate that embodiments of the invention are not so limited. FIG. 2 shows a schematic of a method in accordance with one embodiment of the invention. As shown, a method 200 includes a downhole module 210 and an uphole module 220.

The downhole module 210 takes the waveform array 211 through an initial DSTC processing 213 to produce initial estimates of coherence peak attributes 214 (e.g., slowness (DTS), peak frequency (Fp), etc.). The waveform array 211 is typically acquired and stored in the downhole memory (e.g., 30a in FIG. 1). The initial DSTC processing 213, which will be described in more detail with reference to FIG. 3, may be based on initial guess dispersion curves, which may be obtained from a database containing various dispersion curves based on the initial guess of formation-borehole parameters 212. Note that while the initial DSTC processing 213 is similar to the conventional STC processing described above, the initial DSTC processing 213, in accordance with embodiments of the invention, does not rely on accurate values of formation-borehole parameters. Instead, the initial DSTC processing 213 can be based on "initial guess" values of the formation-borehole parameters. Furthermore, the initial DSTC processing 213 can use a subset of the formation-borehole parameters instead of the full set of parameters used in conventional DSTC processing.

The initial guess values of the formation-borehole parameters may be preloaded in the tool memory or could be generated downhole through a coded tool data acquisition configuration parameter downloaded to the tool's memory during tool initialization. A few limited numbers of formation-borehole parameters, such as "fast" or "slow" mud, and "large" or "in-gauge" hole size, will be sufficient. As noted above, the initial formation-borehole parameters need not be accurate. Having accurate initial guess parameters will help reduce the magnitudes of the correction factors, but is not essential for methods of the invention. The downhole processor (e.g., 30a in FIG. 1) may have a few sets of dispersion curves stored in a database, corresponding to the few initial guess conditions, stored in its memory. The appropriate set may then be selected for the DSTC processing according to the setting of the data acquisition configuration parameters.

The initial guess coherence peak attributes 214 obtained from the initial DSTC processing 213 is then sent via telemetry uphole 215. The telemetry may be mud telemetry or any other telemetry known in the art. The initial guess coherence peak attributes 214 represent condensed information and are much less demanding on the telemetry bandwidth (e.g., in LWD operations). The initial guess coherence peak attributes 214 may be stored on the tool for later retrieval (e.g., in LWT operations). Once these initial guess coherence peak attributes are available uphole, they may be used to derive accurate coherence peak attributes, and hence the formation properties.

As shown in FIG. 2, the uphole module 220 uses a correction factor 222 to correct the initial guess coherence peak attributes 221 that have been sent uphole. The output is a set of corrected coherence peak attributes 224 (e.g., DTs, Fp, etc.). The uphole module 220 will be described in more detail with reference to FIG. 4.

Figure 3:
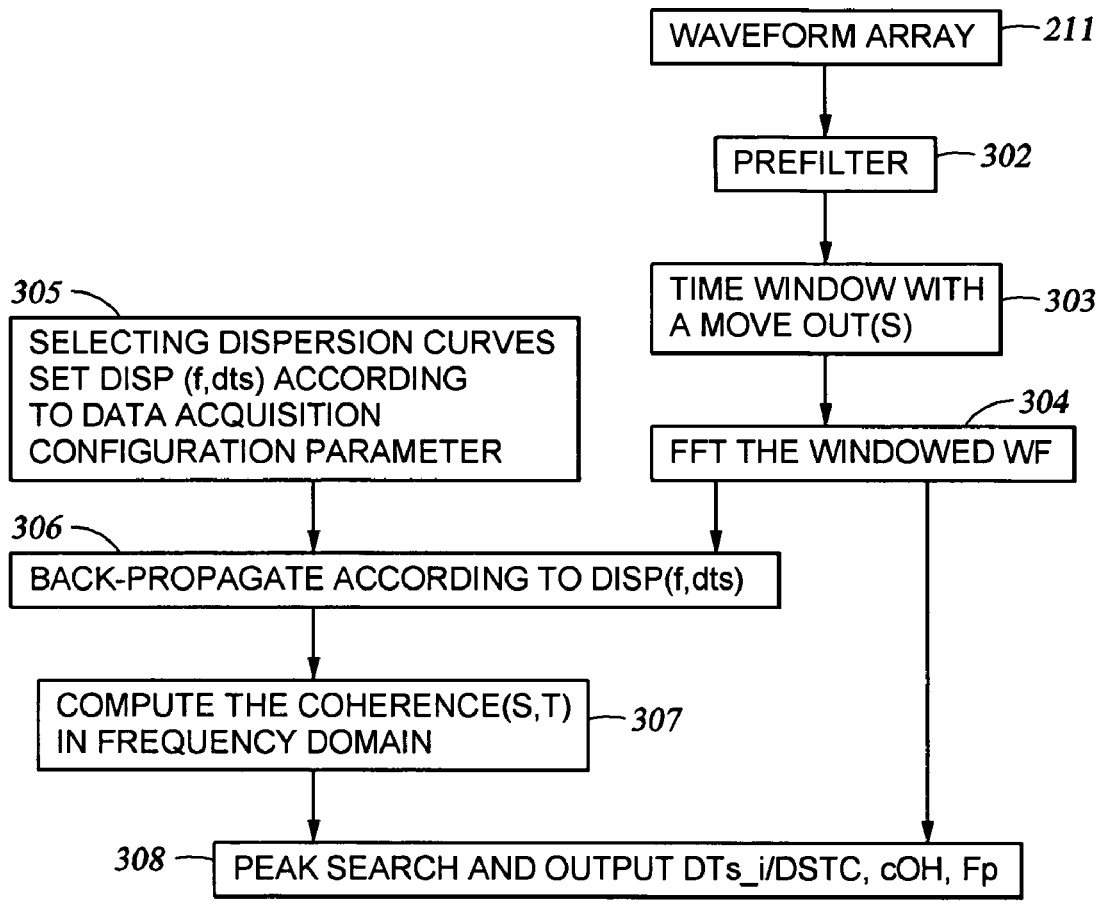
FIG. 3 shows a downhole process of a method in accordance with one embodiment of the invention.

Referring to FIG. 3, which shows the downhole module 210 in more detail. As shown in FIG. 3, the raw data from the logging operation (i.e., the waveform array) 211 may be pre-filtered (step 302) to remove the undesirable components. These undesirable components generally are higher frequency collar arrivals, drilling noise, or other fluid modes, which can be removed using a band pass filter without reducing the information content related to the formation properties. After pre-filtering, a set of time windows with systematically varied starting time (T) and move-out slowness (S) is placed on the array waveforms to further isolate the borehole quadrupole mode components (step 303). This step is similar to that of a conventional STC processing as disclosed in U.S. Pat. No. 4,698,793 issued to Wu (assigned to the present assignee and incorporated by reference in its entirety). The windowed waveforms are then transformed (e.g., by Fourier transformation (FT) or fast Fourier transformation (FFT)) into frequency domain data (step 304). The Fourier transformation produces a windowed waveform spectrum, F(T), from which a peak frequency (Fp) may be computed.

In addition, the frequency domain signals (from Fourier transform, or FFT, in step 304) may be back-propagated (step 306), according to the selected dispersion curve set, disp(f, dts) (305). The dispersion curve set to be used may be selected based on the data acquisition configuration parameters. The term back-propagate refers to the procedure of modifying the phases of the frequency domain signals at all frequency points to nullify the dispersion effects due to the given dispersion curves, disp(f, dts). Semblance or coherence as function of (S, T) is then computed in the frequency domain for the back-propagated signals (step 307). The S and T values corresponding to the peak semblance or coherence (Coh) location in the 2-dimensional S vs. T plane are identified and the attributes of the coherence peak (e.g., shear slowness (DTs_i/DSTC), peak time (Tp)) are output (step 308). In addition, as noted above, the peak frequency (Fp) of the windowed (starting at Tp) waveform spectrum (Fp=F(Tp)) may also be output. The output (i.e., initial estimates of the peak coherent attributes, such as DTs_i/DSTC, Coh, and Fp) may then be sent uphole via an appropriate telemetry link (shown as 215 in FIG. 2). These initial estimates of peak coherent attributes are then used by the uphole module (220 in FIG. 2) to derive the corrected coherence peak attributes, which are then used to derive the formation properties.

Figure 4:
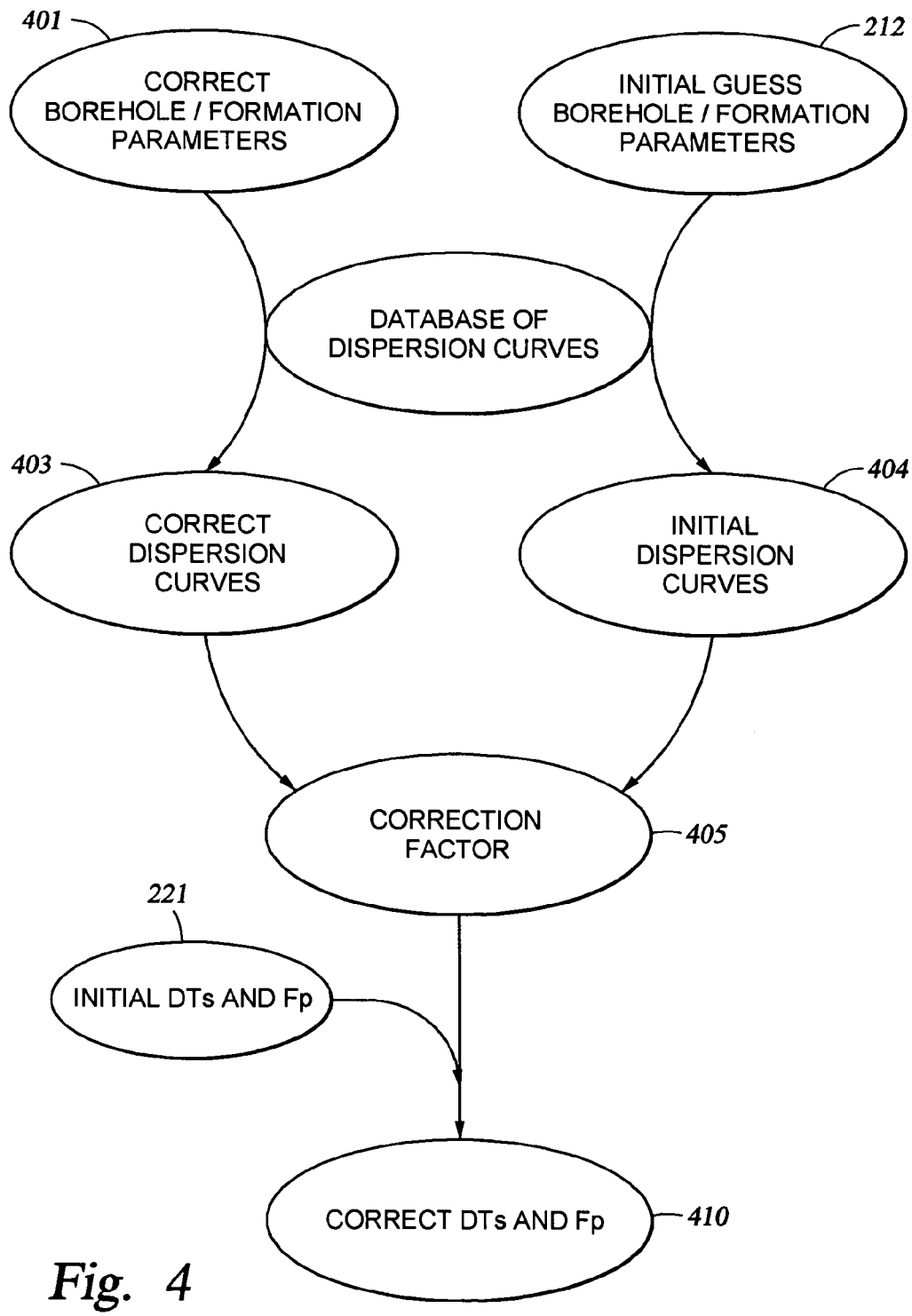
FIG. 4 shows a schematic of an uphole process in accordance with one embodiment of the invention.

FIG. 4 shows a process for deriving the corrected coherence peak attributes from the initial estimates of peak coherent attributes. As shown, the initial estimates of the peak coherent attributes 221 (e.g., DTs, Fp, etc.) need to be corrected to provide the correct peak coherent attributes 410. A correction factor 405 is needed for this correction.

To obtain the correction factor 405, the uphole module 220 needs to have the correct formation-borehole parameters 401. The correct formation-borehole parameters 401 may be obtained from other logging operations or from information derived by other means. The correct formation-borehole parameters 401 and the initial guess formation-borehole parameters 212 are separately used to obtain dispersion curves 403 and 404, respectively, from a database 402 stored in the processor. The correction factor 405 can then be derived from a comparison between the dispersion curves selected for the correct parameters 403 and the dispersion curves selected for the initial guess parameters 404.

The database of dispersion curves 402 may be stored in the memory of the uphole processor (e.g., 27 in FIG. 1). This may include a large database of dispersion curves stored as a function of formation-borehole parameters. The desired dispersion curves (e.g., 403 or 404) may then be selected by comparing the values of the formation-borehole parameters. If the formation-borehole parameters for the particular job are not in the database, then the dispersion curves may be computed, for example, by multi-dimensional interpolation.

Figure 5A:
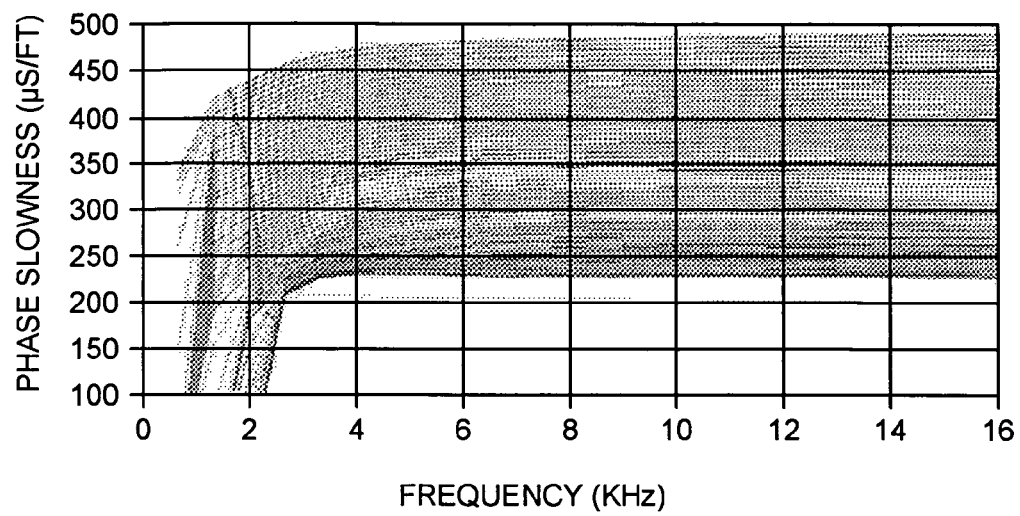
FIGS. 5A-5C show comparison of results from a method in accordance with one embodiment of the invention using an initial guess parameter set and actual parameters.

FIG. 5A shows one example of dispersion curve sets that may be stored in the database. As shown in this graph, the phase slowness (µs/ft) is plotted as a function of frequency (KHz). The interspersed curves correspond to the actual parameter set and to initial guess parameters, in which the mud slowness is 10% higher than the actual values. Also shown in FIG. 5A are the corresponding formation shear slowness for each dispersion curves: dots for actual parameters and for initial guess parameters, in which the mud slowness is 10% higher than the actual value.

Figure 5B:
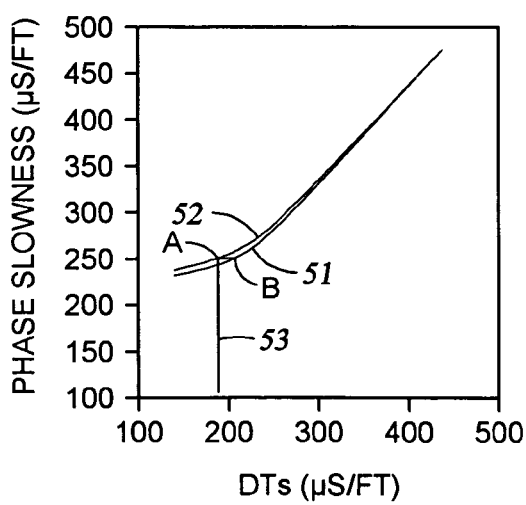
Figure 5C:
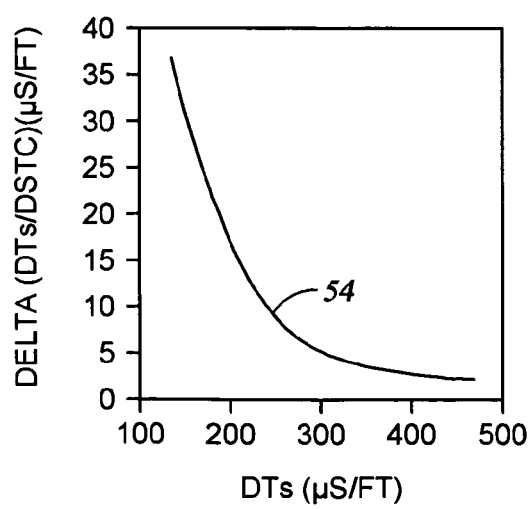

At a given frequency, for example 4 KHz, the phase slownesses of the borehole quadrupole signals as function of DTs (formation shear slowness) for the actual and the initial parameters are shown as curve 51 and curve 52, respectively, in FIG. 5B. These two curves 51 and 52 may be used to correct any inaccuracy in the initial estimates of slowness (DTs). One method of using this graph for error correction is as follows. From a given DTs value (say DTs_i/DSTC=150 µs/ft) on the horizontal axis, one can draw a vertical line 53 to intersect curve 52 (i.e., the curve corresponding to the initial parameters) at point A. From the intersection point A, a horizontal line is drawn to intersect curve 51 (i.e., the curve corresponding to the actual parameters) at point B. The horizontal distance between these two intersection points A and B (or between curves 51 and 52) is the correction factor at 4 KHz needed to be added to the initial guess slowness (DTs_i/DSTC=150 ms/ft) to produce a corrected slowness The correct slowness should be close to the value obtained when the waveform data are processed using the dispersion curves from the actual parameters. The correction factor for each initial estimate slowness (DTs_i) may be found by repeating the process described above. The correction factors as a function of DTs_i (initial estimates of shear slowness) are shown in FIG. 5C as a correction factor curve 54. Having the correction factor curve 54, any DTs_i values within the range can be easily corrected by looking up the corresponding correction factor for the particular DTs_i.

For a single frequency DSTC processing, the above method will produce a corrected DTs_c/DSTC value that matches the answer from the single frequency processing of the waveform data using the dispersion curves from the actual parameters. However, for wide band DSTC processing, the above method, using the correction factor derived from the peak frequency of the windowed waveforms, may not match the answer from the wide band processing of the waveform data using the dispersion curves from the actual parameters, but will be very close. Tests of this method using field data sets indicates that the corrected DTs_c/DSTC values are generally within 1% of the corresponding values obtained from processing the waveforms with the correct borehole/formation parameters.

Although the above description uses quadrupole sonic signal processing for shear slowness as an example, applications of the techniques of the invention are not limited to extracting shear slowness from quadrupole signals. With regard to sonic data, any model based processing, such as the leaky fluid mode processing for compressional slowness, could also benefit from methods of the invention for real-time application. Another application of the invention is for faster re-processing of the sonic data with refined parameter values without the burden of carrying the waveform and the DSTC computational load. That is, whenever refined formation-borehole parameters become available, the previously processed sonic data can be corrected for any improvement in the formation-borehole parameters using a method of the invention, without performing the DSTC from the waveform data de novo.

Figure 6:
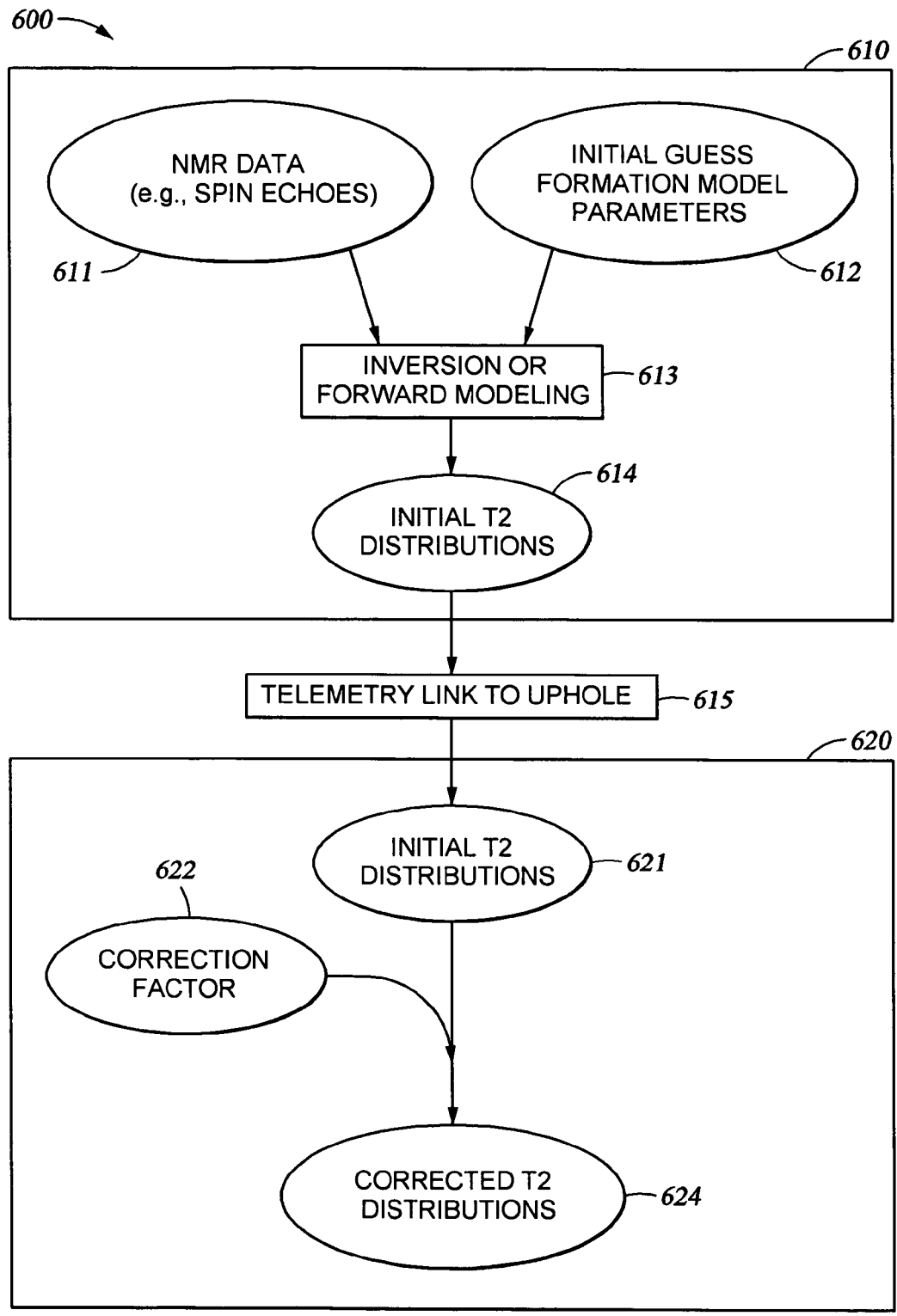
FIG. 6 shows a method for well log data processing in accordance with one embodiment of the invention.

In addition, embodiments of the invention may also be used to process data other than sonic data. In fact, methods of the invention may be used in any model based data processing, including, for example, NMR and resistivity data processing. FIG. 6 shows a general scheme of a method of the invention, which may be used to simplify other log data (such as NMR data) downhole to facilitate telemetry transmission, and to extract more accurate formation parameters from the simplified data that have been transmitted uphole.

As shown in FIG. 6, a method 600 includes a downhole module 610 and an uphole module 620. The downhole module 610 may use a formation model with initial guess formation-borehole parameters 612 to process the NMR data (e.g., spin echoes) 611. The processing 613 may use inversion or forward modeling in a way similar to conventional inversion or forward modeling. The results from this initial processing may be an initial estimate of transverse relaxation time ($T_2$) distribution 614, for example. The initial estimate of $T_2$ distribution is then sent via telemetry uphole 615.

The uphole module 620 then uses a correction factor 622 to correct any inaccuracy in the initial estimate of $T_2$ distribution 621. After the correction, the corrected $T_2$ distribution 624 is then obtained. The correction factor 622 may be derived from a comparison between the $T_2$ distribution curves obtained with actual formation-borehole parameters and that obtained with the initial guess formation-borehole parameters.

While FIG. 6 shows an example of NMR data processing, one of ordinary skill in the art would appreciate that the same approach may be applied to other types of downhole data. Any formation log data that can be inverted based on a borehole/formation model may be processed with a method as outlined in FIG. 6. First, an initial set of borehole/formation parameters is used with the model to derive an initial estimate of one or more desired parameters. The initial estimate of the desired parameter is then refined (or corrected), when a second set of borehole/formation parameters (which are more accurate) becomes available, to provide a more accurate estimate of the desired parameter. Therefore, embodiments of the invention are not limited to any specific types of data.

Some embodiments of the invention relate to systems for performing the techniques of the invention. A system in accordance with embodiments of the invention may use a downhole processor (e.g., 30 a in FIG. 1) and a surface processor (e.g., 27 in FIG. 1) that include memories for storing programs having instructions for performing the steps described herein.

Advantages of the invention may include one or more of the following. Embodiments of the invention provide methods for data simplification in the downhole environment so that the telemetry bandwidth requirement may be reduced. Therefore, methods of the invention may facilitate the transmission of data uphole in real time, which would otherwise be impossible. The methods of the invention may be based on similar data processing methods commonly used in the art. However, methods of the invention do not require accurate formation-borehole parameters for the processing. Embodiments of the invention further provide methods that can correct any inaccuracy in the initial estimates of the formation properties (e.g., formation shear slowness) derived from the data simplification step. The combination of the simplification, telemetry, and correction steps enables accurate formation properties (e.g., formation shear slowness) to be delivered in real-time. Real-time delivery of the formation shear slowness has many important applications, such as pore pressure and wellbore stability predictions. These applications will enable a driller to safely drill a well.

For the purposes of this specification it will be clearly understood that the word "comprising" means "including but not limited to", and that the word "comprises" has a corresponding meaning.

What is claimed is:

1. A method for processing dispersive sonic waveform data, comprising:
   processing the sonic waveform data, based on an initial guess set of formation-borehole parameters, to produce initial coherence peak attributes, wherein the processing is performed in a borehole;
   sending the initial coherence peak attributes uphole via telemetry; and
   correcting the initial coherence peak attributes, based on a second set of formation-borehole parameters, to produce corrected coherence peak attributes,
   wherein the correcting comprises adding a correction factor to the initial coherence peak attributes, the correction factor being derived from a comparison between an initial guess set of dispersion curves corresponding to the initial guess set of formation-borehole parameters and a second set of dispersion curves corresponding to the second set of formation-borehole parameters, and
   wherein the comparison comprises a difference between the initial guess set of dispersion curves and the second set of dispersion curves.

2. The method of claim 1, wherein the processing uses a dispersive slowness-time-coherence method and the initial coherence peak attributes comprise compressional slowness.

3. The method of claim 2, wherein the processing comprises:
   obtaining an initial guess set of dispersion curves based on the initial guess set of formation-borehole parameters;
   transforming the waveform data to produce frequency domain data;
   correcting phases in the frequency domain data based on the initial set of dispersion curves; and
   computing the initial coherence peak attributes from the phase corrected frequency domain data.

4. The method of claim 3, wherein the obtaining the initial guess set of dispersion curves is by selecting from a database.

5. The method of claim 3, wherein the transforming uses Fourier transformation or fast Fourier transformation.

6. The method of claim 3, further comprising pre-filtering the sonic waveform data to remove unwanted components before the transforming.

7. The method of claim 6, wherein the transforming further comprises deriving windowed waveforms from the pre-filtered sonic waveform data.

8. The method of claim 3, wherein the processing further comprises deriving peak frequencies from the frequency domain data, wherein the initial coherence peak attributes include the peak frequencies.

9. The method of claim 1, wherein the processing uses a dispersive slowness-time-coherence method and the initial coherence peak attributes comprise shear slowness.

10. The method of claim 9, wherein the processing comprises:
   obtaining an initial guess set of dispersion curves based on the initial guess set of formation-borehole parameters;
   transforming the waveform data to produce frequency domain data;
   correcting phases in the frequency domain data based on the initial set of dispersion curves; and computing the initial coherence peak attributes from the phase corrected frequency domain data.

11. The method of claim 10, wherein the obtaining the initial guess set of dispersion curves is by selecting from a database.

12. The method of claim 10, wherein the transforming uses Fourier transformation or fast Fourier transformation.

13. The method of claim 10, further comprising pre-filtering the sonic waveform data to remove unwanted components before the transforming.

14. The method of claim 13, wherein the transforming further comprises deriving windowed waveforms from the pre-filtered sonic waveform data.

15. The method of claim 10, wherein the processing further comprises deriving peak frequencies from the frequency domain data, wherein the initial coherence peak attributes include the peak frequencies.

16. The method of claim 1, wherein the telemetry comprises mud telemetry.

17. The method of claim 1, wherein the initial, set of dispersion curves and the second set of dispersion curves are selected from a database.

18. The method of claim 1, wherein the second set of formation-borehole parameters is obtained from a logging operation.

19. A method for processing dispersive sonic waveform data, comprising:
   transmitting and receiving the dispersive sonic waveform data by using an acoustic logging tool;
   computing original coherence peak attributes corresponding to a guess set of formation-borehole parameters, wherein the computing is performed in a borehole;
   sending the original coherence peak attributes uphole via telemetry;
   comparing the guess set of formation-borehole parameters used to compute the original coherence peak attributes and a second set of formation-borehole parameters for a correction factor; and
   correcting the original coherence peak attributes by adding the correction factor,
   wherein the correction factor is derived from a difference between the guess set of formation-borehole parameters and the second set of formation-borehole parameters.

20. A system for processing dispersive sonic waveform data, comprising:
   first processor means for processing the sonic waveform data, based on an initial guess set of formation-borehole parameters, to produce initial coherence peak attributes; and
   second processor means for correcting the initial coherence peak attributes, based on a second set of formation-borehole parameters, to produce corrected coherence peak attributes, wherein the correcting comprises adding a difference between the initial guess set of formation-borehole parameters and the second set of formation-borehole parameters, and adding the difference to the initial coherence peak attributes.

* * * * *